US010938737B1

(12) United States Patent
Wegleitner et al.

(10) Patent No.: US 10,938,737 B1
(45) Date of Patent: Mar. 2, 2021

(54) RESOURCE DOCUMENT HANDLING NETWORK WITH PORTABLE TRANSFER CONTAINERS

(71) Applicant: BANK OF AMERICA CORPORATION, Charlotte, NC (US)

(72) Inventors: Edwin Andrew Wegleitner, Aiken, SC (US); Rebecca Stepp Morgan, Charlottesville, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/829,885

(22) Filed: Mar. 25, 2020

(51) Int. Cl.
*H04L 12/911* (2013.01)
*H04L 29/06* (2006.01)
*H04L 29/08* (2006.01)

(52) U.S. Cl.
CPC .............. *H04L 47/78* (2013.01); *H04L 63/08* (2013.01); *H04L 63/107* (2013.01); *H04L 67/10* (2013.01)

(58) Field of Classification Search
CPC ....... H04L 47/78; H04L 67/10; H04L 63/107; H04L 63/08
See application file for complete search history.

(56) References Cited

U.S. PATENT DOCUMENTS

| 6,938,021 | B2* | 8/2005 | Shear | G06Q 20/3674 |
| | | | | 705/67 |
| 2007/0049258 | A1* | 3/2007 | Thibeault | H04L 51/38 |
| | | | | 455/414.1 |
| 2011/0167078 | A1* | 7/2011 | Benjamin | G06Q 10/107 |
| | | | | 707/769 |
| 2013/0219176 | A1* | 8/2013 | Akella | G06F 16/185 |
| | | | | 713/165 |
| 2015/0256526 | A1* | 9/2015 | Biegala | H04L 63/20 |
| | | | | 726/6 |
| 2017/0060814 | A1* | 3/2017 | Kohlmeier | G06F 40/253 |
| 2017/0116640 | A1* | 4/2017 | Sah | G06Q 30/0244 |

* cited by examiner

*Primary Examiner* — Michael Won
(74) *Attorney, Agent, or Firm* — Michael A. Springs; Moore & Van Allen PLLC; Nicholas C. Russell

(57) ABSTRACT

A portable transfer container associated with a resource document handling network that provides for optimization of the physical handling of resources within a supply chain network. The container typically includes an item storage unit and a resource transfer unit configured to deposit, withdraw, or otherwise exchange items stored in the item storage unit. The container also typically includes a memory, a processor, and an item transfer application stored in the memory. As resources are placed into the container the system generates a ledger of the container, physical resources within the container, and owners of the resources within the container. As such, with the ledger, the container may be universally used by one or more users or entities across the supply chain network. As such, the container may be portable and may be exchanged with other entities, other containers, recycled, or provided to storage.

19 Claims, 8 Drawing Sheets

RESOURCE DOCUMENT HANDLING NETWORK WITH PORTABLE TRANSFER CONTAINERS

BACKGROUND

There are various devices that can be used for dispensing or storing items. That said, a needs exists for improved way of dispensing and storing items across a network.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the invention are directed to a system, method, or computer program product for a resource document handling network with portable transfer containers.

The invention optimize the physical handling of resources within a supply chain network. As such, the system completely eliminates user physical interaction with physical resource documents. A user may initially deposit the physical resources into a portable transfer container, the system may count the amount of resources, delegate an owner or owner account associated with those resources, and place the physical resource into a specific cassette associate with the portable transfer container. As more resources are placed into the container by one or more users the system generates a ledger of the container, physical resources within the container, denominations of resources within the container, and owners of the resources within the container. As such, with the ledger, the container may be universally used by one or more users or entities across the supply chain network. As such, the container may be portable and may be exchanged with other entities, other containers, recycled, or provided to vault storage. In this way, the system may also track the physical resource documents in the containers without introducing any user interaction with the physical resource documents.

In some embodiments, the containers may be user to transfer physical resource documents, store physical resource documents, safely exchange denominations, service cash registers or automated teller machines (ATM) or the like. Currently, when physical resources are being distributed or an ATM is being serviced, several individuals physically handle resource documents either by physically adding or removing money from the ATM or other machines. This leads to potential mismatching in tracking and auditing. The system allows for containers to be interchangeable between tellers, ATMs, vaults, entities, users, and the like to continually allow for exchange of containers, faster response times for physical document distribution, and machine tracking of the physical resource documents.

In some aspects, the present invention embraces a portable item transfer container and a method of transferring physical items via the portable item transfer container. The portable item transfer container typically includes: an item storage unit; an item transfer unit configured to (i) dispense one or more first items stored in the item storage unit and (ii) receive one or more second items and store the one or more second items in the item storage unit; an image capture device; and a communication device. The portable item transfer container also typically includes: a memory; a processor; an item inventory stored in the memory; and an item transfer application stored in the memory and executable by the processor.

Embodiments of the invention relate to systems, methods, and computer program products for providing a network of portable transfer containers, the invention comprising; generating multiple portable transfer containers, wherein a portable transfer container is configured to store resource distribution documents, dispense resource distribution documents, and receive resource distribution documents; communicable linking the multiple portable transfer containers across a network to a centralized ledger database; identifying an amount, denomination, and directive destination for resource distribution documents received at a portable transfer container of the multiple portable transfer containers across the network; compiling, in real-time, the amount, denomination, and directive destination for resource distribution documents received at the multiple portable transfer containers via the communicable linage; receiving a request for a specific denomination of resource distribution documents from a user with the network; identifying a portable transfer container with the denomination of the request and allow for transmission of the identified portable transfer container to a requestor of the request; and exchanging the portable transfer container at the requestor with the identified portable transfer container.

In some embodiments, the portable transfer container comprises: a storage unit; a resource distribution document transfer unit configured to dispense resource distribution documents and receive resource distribution documents; a user interface, wherein the user interface is configured for receiving activity request from the user; an image capture device; a communication device; a memory; and a processor.

In some embodiments, receiving resource distribution documents from a user at a portable transfer container further comprises: authenticating an identity of the user; and comparing an authorized region of the user and a location of the portable transfer container and determining that the location of the portable item transfer container is within the authorized region of the user.

In some embodiments, the invention further comprises receiving resource distribution documents from a user at the portable transfer container, wherein the user is depositing the resource distribution documents.

In some embodiments, the invention further comprises withdrawing resource distribution documents from the portable transfer container for a user authorized to withdraw resource distribution documents.

In some embodiments, identifying an amount, denomination, and directive destination for the received resource distribution documents further comprises taking an image of the resource distribution documents as the resource distribution documents are being received and withdrawn at the portable transfer container.

In some embodiments, exchanging the portable transfer container at the requestor with the identified portable transfer container further comprises updating the ledger with the exchange and reconciling accounts associated with the exchange and the portable transfer container.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
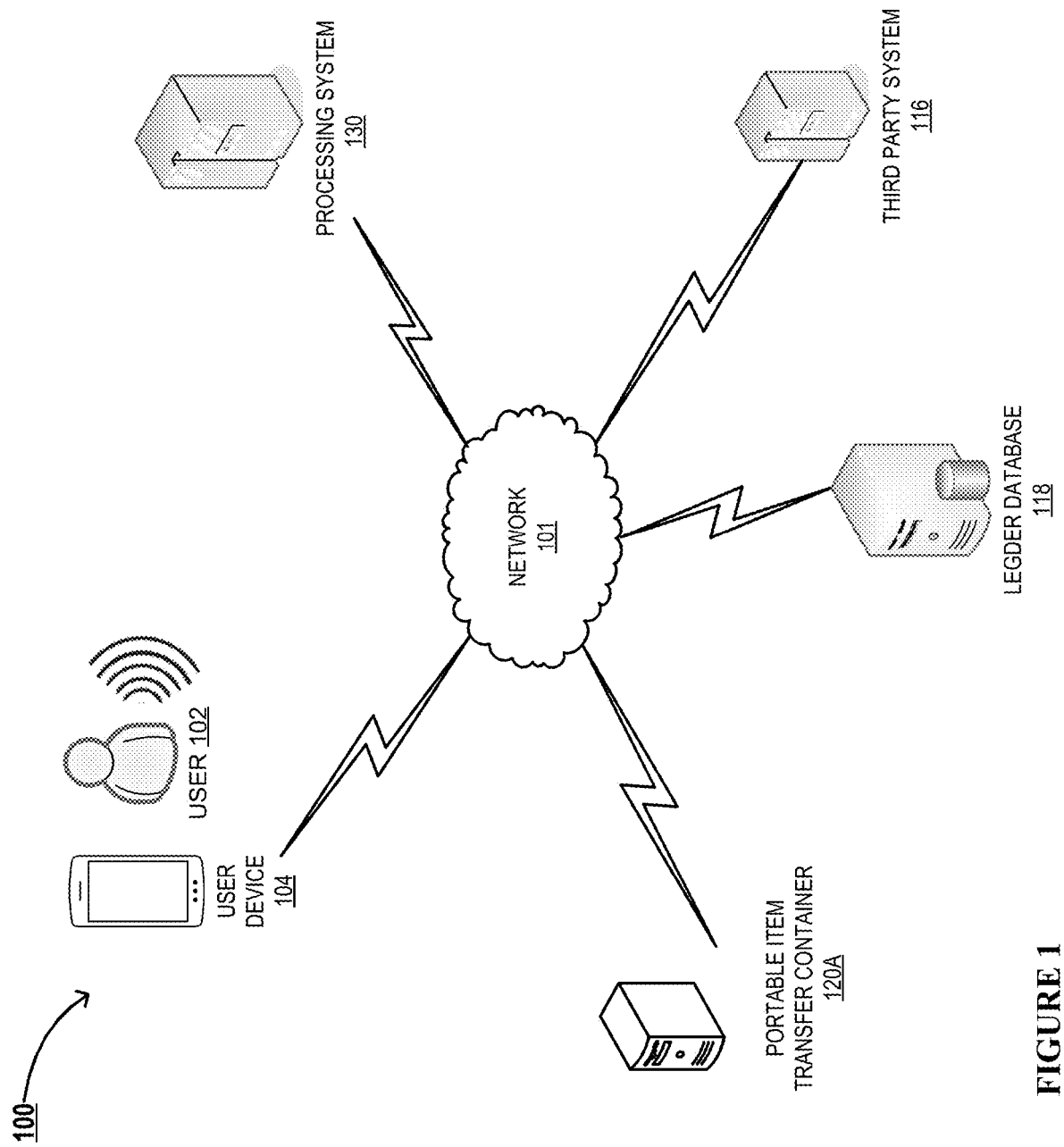
FIG. 1 illustrates a block network architecture diagram illustrating a system environment 100 for resource document handling with portable transfer containers, in accordance with an embodiment of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution, establishment or enterprise, associated with network connected portable item transfer containers and a corresponding processing system. As such, the entity may be any institution, group, association, financial institution, merchant, establishment, company, union, authority or the like. Typically, the entity is associated with one or more portable item transfer containers. Typically, the entity owns, operates, provides, facilitates services associated with, and/or is otherwise associated with the portable item transfer containers and corresponding processing system.

As described herein, a "user" is an individual with an account or an individual associated with an entity having an account at a financial institution. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with a portable item transfer container, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and devices described herein. In other embodiments, a user may be a system or an entity performing one or more tasks described herein.

The term "portable transfer container" or "portable item transfer container" or "container" as used herein may refer to one or more portable item transfer containers that facilitate one or more user activities or transactions, such as transferring physical items such as physical resources from one location to another without human interaction. In some embodiments, the portable item transfer container facilitates execution of financial transactions or activities. In some embodiments, the portable item transfer container may facilitate execution of non-financial user activities or transactions. In embodiments described herein, performing a user activity or transaction may refer to the initiation, stages during the processing, or completion of a transaction. The portable transfer container may be universal, in that no matter the location of distribution it is able to be utilized for the secure deposit, withdraw, recycle, or relocation of resource distribution documents.

Many of the embodiments and example implementations thereof described herein are directed toward solving technical problems associated with the transfer of physical items. The physical items or "items", in general, typically refer to objects or artifacts that are processed (e.g., by the container 120A described herein) for performing one or more user activities, such as, cash, bills, checks, items associated with a certain value, and the like. In addition to the foregoing, in some embodiments of the invention, the physical items or items may refer to items or objects (e.g., purchase orders, legal documents, certificates, or other items/artifacts that may sought to be securely transported or moved) that are securely managed and securely transported (e.g., using the container 120A described herein) from one geographic location to another. In the financial context, a user may wish to deposit physical items (e.g., cash or checks) and have the value of such physical items credited to an account, for example, in real-time. In addition, a user may wish to withdraw funds from an account in the form of physical items (e.g., cash). These transfers are typically performed either at a physical location of a financial institution (e.g. at a bank branch) or by using an automated teller machine (ATM).

In order to solve these technical problems, in one aspect, the present invention relates to a portable item transfer container which a user may use to deposit items, withdraw items, exchange items, or store items. In some embodiments, the portable item transfer container is configured to be moved or carried to a location by a user (for example, the location may be within a facility location or within a predetermined area). As such, a user may be able to complete an item transfer at a location where the user feels secure, rather than in a public space. In order to further enhance security, functionality provided by the portable item transfer container may be location or network specific In some embodiments, the portable item transfer container maintains an inventory of the items it stores. As items are withdrawn from the portable item transfer container or deposited into the portable item transfer container, the portable item transfer container typically updates the item inventory, for example, in real time. Based on the maintaining the item inventory via a ledger, the portable item transfer container may be able to identify a surplus or deficiency of any types of items stored by the portable item transfer container. In the event that the portable item transfer container determines that it has a surplus or deficiency, the portable item transfer container may obtain items and/or exchange items with another portable item transfer container when the portable container is docked in a container receptacle of the resource terminal.

In some embodiments, the portable item transfer container is able to recycle items that have been deposited in the portable item transfer container. In this regard, instead of having separate containers for items that may be dispensed by the portable item transfer container and items that have been deposited in the portable item transfer container by a user, deposited items and items that may be dispensed are typically stored together in a common container. By storing items in a common container and by maintaining an accurate inventory of stored items, the portable item transfer container may receive items (e.g., cash) from one user and then subsequently dispense those same items to a different user, while being able to accurately and instantaneously update their respective accounts. By recycling at least some deposited items, the present invention is able to reduce the frequency of which the portable item transfer container runs out of certain types of items.

The invention optimize the physical handling of resources within a supply chain network. As such, the system completely eliminates user physical interaction with physical resource documents. A user may initially deposit the physical resources into a portable transfer container, the system may count the amount of resources, delegate an owner or owner account associated with those resources, and place the physical resource into a specific cassette associate with the portable transfer container. As more resources are placed into the container by one or more users the system generates a ledger of the container, physical resources within the container, denominations of resources within the container, and owners of the resources within the container. As such, with the ledger, the container may be universally used by one or more users or entities across the supply chain network. As such, the container may be portable and may be exchanged with other entities, other containers, recycled, or provided to vault storage. In this way, the system may also track the physical resource documents in the containers without introducing any user interaction with the physical resource documents.

In some embodiments, the containers may be user to transfer physical resource documents, store physical resource documents, safely exchange denominations, service cash registers or automated teller machines (ATM) or the like. Currently, when physical resources are being distributed or an ATM is being serviced, several individuals physically handle resource documents either by physically adding or removing money from the ATM or other machines. This leads to potential mismatching in tracking and auditing. The system allows for containers to be interchangeable between tellers, ATMs, vaults, entities, users, and the like to continually allow for exchange of containers, faster response times for physical document distribution, and machine tracking of the physical resource documents.

Referring to FIG. 1, a block diagram illustrating a system environment 100 configured for providing the transfer of resource distribution documents via portable item transfer containers, is illustrated, in accordance with some embodiments of the invention. As illustrated, the system environment 100 may include an portable item transfer container 120A, in operative communication with one or more user devices 104 associated with a user 102, a processing system 130, a ledger database 118, a third party system 116, and/or other systems/devices not illustrated herein, via a network 101. As such, each portable item transfer container 120 is typically configured such that the user 102 may perform one or more user activities or transactions by utilizing the portable item transfer container directly (for example, by physically operating the portable item transfer container 120 and its interfaces, using input/output devices of the portable item transfer container 120, using audio commands, using physical gestures, and the like) and/or via communication between the user device 104 and the portable item transfer container 120 (for example, by establishing operative communication channels between the user device 104 and the portable item transfer container 120 via a wireless network and interacting with the portable item transfer container 120 via the devices and interfaces of the user device 104) for the insertion, retrieval, or otherwise relocation of resource distribution documents via the containers.

Typically, the processing system 130 and the ledger database 118 are in electronic communication with each portable item transfer container 120, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the portable item transfer container 120A). In this regard, the wireless communication channel may further comprise near field communication (NFC), communication via radio waves, communication through the internet, communication via electromagnetic waves and the like.

As discussed previously, the portable item transfer container 120A is typically configured to allow the user 102 to transfer, store, deposit, or withdraw resource distribution documents, and is configured to provide real-time interactive sessions and reconciliation for the user 102. The components of each portable item transfer container 120, its features and functions will be described in detail throughout this disclosure and with respect to FIG. 2A, in particular.

As alluded to previously, the processing system 130 is typically in operative communication with the portable item transfer container 120A. In some embodiments, the processing system 130 is configured to transmit control instructions that are configured to cause the portable item transfer container 120A, and/or the user device 104 to perform at least a portion of the steps associated with one or more activities. The processing system 130 may be associated with the same entity as the portable item transfer container 120A or may be associated with another entity. The structure and components of the processing system 130 are described in detail with respect to FIG. 3. The portable item transfer container 120A may further communicate with the third party system 116 and/or the ledger database 118, either directly or via the processing system 130. The ledger database 118 may comprise a ledger of the resource distribution documents, denominations, user deposits, user withdraws, accounts associated with the resource distribution documents and the like associated with the container. In this way, the ledger database 118 may contain all ledger information for the contents of the container and all containers within the network.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. As discussed previously, in some embodiments, the portable item transfer containers 120 of the present invention are configured to establish operative communication channels with the user device 104 such that, the user 102 may perform one or more user activities, either entirely or in part, at an portable item transfer container 120 by interacting with the user device 104. The user device 104 is described in detail with respect to FIG. 4.

Figure 2A:
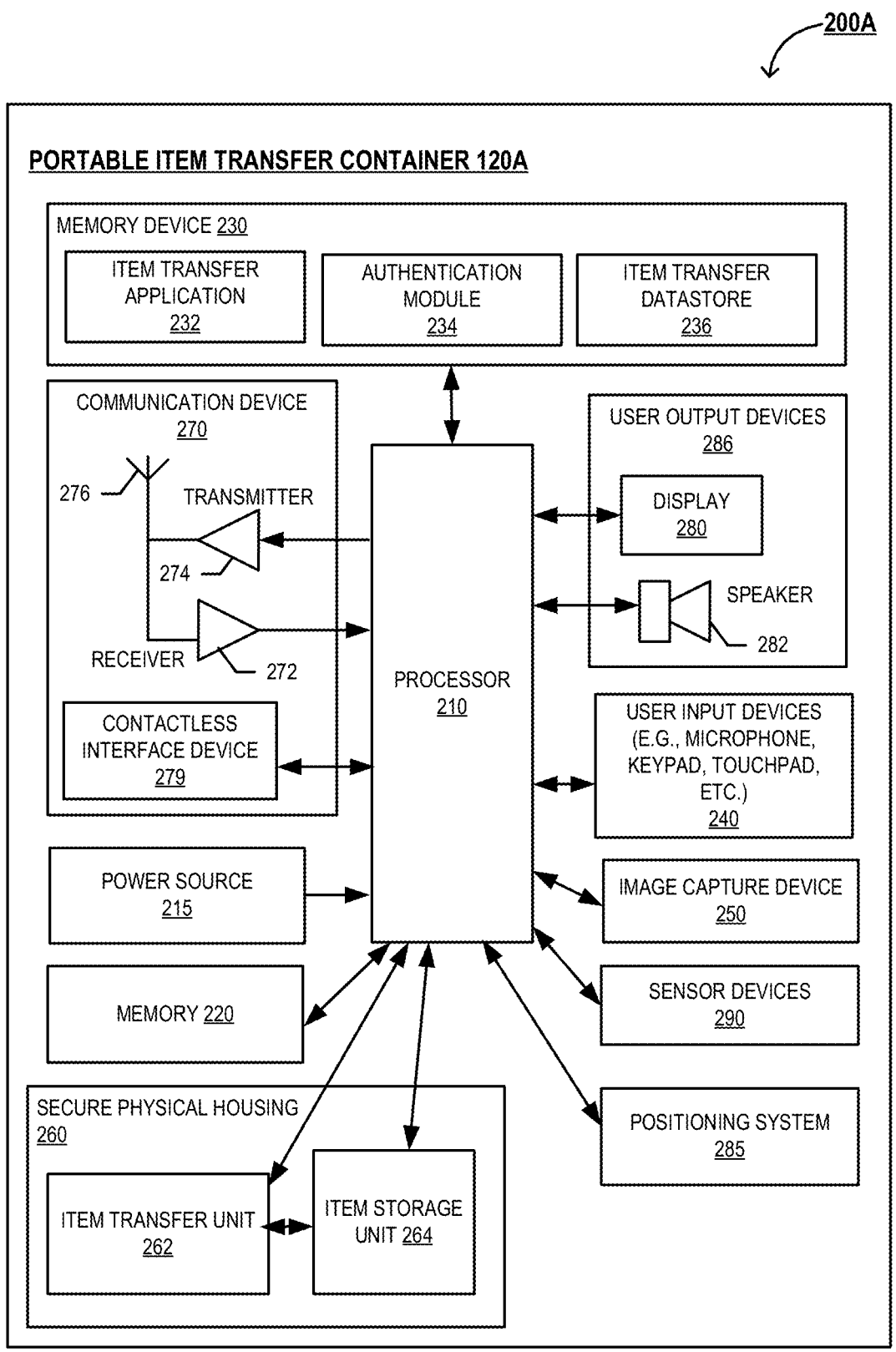
FIG. 2A illustrates a block diagram 200A of a portable item transfer container, in accordance with an embodiment of the invention.

FIG. 2A, illustrates a block diagram 200 of the portable item transfer container 120A, in accordance with some embodiments of the invention. As discussed previously, the portable item transfer container 120A is configured to facilitate performance of user activities, such as transferring, depositing, withdrawing, or otherwise distributing of physical resource distribution documents, such as cash, and is typically configured to provide real-time interactive sessions and reconciliation for the user 102. The portable item transfer container 120A typically includes a processing device or a processor 210, memory device 230, storage memory 220 or datastore 220, and a communication device 270. As such, the portable item transfer container 120A, and the processor 210 is particular, is configured to perform at least a portion of the steps of the embodiments described herein, either based on executing computer readable instructions stored in the memory device 230, by causing other devices and systems (such as the user device 104) to perform one or more steps described herein, and/or based on receiving instructions, indications, or signals from other systems and devices such as the processing system 130, the user device 104, and/or other systems. In some embodiments, the processing system 130 is configured to transmit control instructions to, and cause the processor 210 of the portable item transfer container 120A to perform one or more steps of the embodiments presented herein.

The processor 210 may generally refer to a device or combination of devices having circuitry used for implementing the communication and/or logic functions of the portable item transfer container 120A. For example, the processor 210 may include a control unit, a digital signal processor device, a microprocessor device, and various analog-to-digital converters, digital-to-analog converters, and other support circuits and/or combinations of the foregoing. Control and signal processing functions of the portable item transfer container 120A may be allocated between these processing devices according to their respective capabilities.

The portable item transfer container 120A may further include various components/devices in operative communication with and/or controlled by the processor 210, such as user output devices 286, user input devices 240, a network communication interface 279 (such as a contactless interface 279), a power source 215, and the like. Furthermore, in some embodiments, the processor 210 is operatively coupled to and is configured to control other components/devices of the portable item transfer container 120A, such as an image capture device 250, sensor devices 290, an item transfer unit 262, and the like. These components and devices are described in detail below.

The memory device 230 and the storage memory 220 may generally refer to a device or combination of devices that store one or more forms of computer-readable media for storing data and/or computer-executable program code/instructions. In some embodiments, the storage memory 220 is integral with the memory device 230. In some embodiments, the memory device 230 comprises a non-transitory, computer readable storage medium comprising executable instructions that when executed by the processor 210, cause the processor to perform one or more functions of the portable item transfer container 120A. For example, the memory device 230 and/or the storage memory 220 may include any computer memory that provides an actual or virtual space to temporarily or permanently store data and/or commands provided to the processor 210 when it carries out its functions described herein.

As illustrated by FIG. 2A, the memory device 230 typically comprises an item transfer application 232, an authentication module 234, an item transfer application datastore 236 stored therein. In some embodiments, the authentication module 234 is integral with the item transfer application 232. In some embodiments, the item transfer application 232 and/or the authentication module 234 may be executable to initiate, perform, complete, and/or facilitate one or more portions of any embodiment described and/or contemplated herein, either independently or in response to receiving control instructions from the processing system 130. In some embodiments, the item transfer application 232 comprises computer readable instructions stored in the memory device 230, which when executed by the processor 210, are configured to cause the processor 210 to perform one or more steps of the embodiments presented herein, and/or cause the processing device to transmit control instructions to other components of the portable item transfer container 120A and other devices/systems in the network 101 to cause them to perform the steps. Generally, the item transfer application 232 is executable to receive activity instructions from the user and perform various functions in addition to the specific steps of the embodiments presented herein, as appreciated by those skilled in the art. The item transfer application 232 may be coupled to an item transfer datastore 236 for storing application data as user activities are being performed. The item transfer datastore 236 may store the application data temporarily for the predetermined duration of the execution of the activity (such as a memory buffer, or cache memory), or permanently. In some embodiments, the item transfer datastore 236 includes an inventory of items located in the item storage unit 264.

The portable item transfer container 120A may require users to identify and/or authenticate themselves before the portable item transfer container 120A may initiate, perform, complete, and/or facilitate a user activity. For example, in some embodiments, the portable item transfer container 120A is configured (and/or the item transfer application 232 is executable) to authenticate a user based at least partially on a debit card, smart card, token (e.g., USB token, etc.), username, password, PIN, biometric information, and/or one or more other credentials that the user presents to the portable item transfer container 120A. Additionally or alternatively, in some embodiments, the portable item transfer container 120A is configured to authenticate a user by using one-, two-, or multi-factor authentication. For example, in some embodiments, the portable item transfer container 120A requires two-factor authentication, such that the user provides a valid debit card and enter the correct PIN associated with the debit card in order to authenticate the user to the portable item transfer container 120A. In some embodiments, these authentication credentials are received at the portable item transfer container 120A via input 240 and output 286 devices of the portable item transfer container 120A. In some embodiments, the authentication credentials are received via a user interface of the user device 104.

In some embodiments, the authentication module 234 comprises computer readable instructions that when executed by the processor 210 cause the processing device to perform one or more functions and/or transmit control instructions to other components or devices (such as the user device 104) to perform one or more authentication steps described herein. These authentication steps typically include requesting authentication credentials from the user via the user output devices 286 and/or via user interfaces/output devices of the user device 104 (for example, based on determining the desired authorization level for the user activity), activating pertinent sensors and devices for receipt of the credentials (for example, sensor devices 290/image capture devices 250 for biometric credentials, card reader devices for reading magnetic strips of the user's card(s), contact less interface device 279 for receiving authentication tokens from a user device via NFC channels, and the like), receiving authentication credentials, validating the credentials (for example based on retrieving user credentials from the datastore 236, memory 220, processing system 130 and/or database 118), and the like. That said, as shown, the processor 210, in turn, is operatively connected to and is also configured to control and cause the communication device 270, the memory device 230, and other components described herein to perform one or more functions, at least in part.

The communication device 270 may comprise a modem (not illustrated), a receiver 272, a server (not illustrated), a transmitter 274, transceiver, and/or another device for communicating with other devices and systems on the network 101. The communication device 270 may further comprise a contact, contactless, wireless and/or wired interface that is configured to establish communication between components of the portable item transfer container 120A, between the portable item transfer container 120A, particularly the processor 210, and other devices or systems, such as the processing system 130, the user device 104, the ledger database 118, the third party system 116, and the like. In this regard, the communication device 270 typically comprises a transmitter 274, a receiver 272, a broadcasting device 276 to transmit and receive signals from corresponding devices via a suitable transmission medium or a communication channel. In some embodiments, the portable item transfer container 120A is configured to be coupled/connected to other devices and systems via wired communication channels. In other embodiments, the portable item transfer container 120A is configured to be coupled/connected to other devices via a wireless channel. The communication device 270 may further comprise a contactless interface device 279 for establishing contactless communication with other devices, such as the user device 104. Here, the portable item transfer container 120A may include a transceiver, i.e., one or more antennas and and/or other electronic circuitry, devices, and software, for receiving data when a device is held close to or tapped at a suitable location of the portable item transfer container 120A. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 may transmit and receive radio frequency signals, respectively, from the portable item transfer container 120A within a distance of up to approximately 25 cm, and from 0-20 cm, such as from 0-15 cm, and 0-10 cm, and the like. Specifically, the communication device may employ NFC channel features described above to operatively communicate with the user device 104.

Establishing the communication channels may also include signaling information in accordance with the air interface standard of the applicable cellular system of the wireless telephone network that may be part of the network 101. In this regard, the portable item transfer container 120A may be configured to operate with one or more air interface standards, communication protocols, modulation types, and access types.

The user interface of the portable item transfer container 120A may include user input devices 240 and user output devices 286, as illustrated by FIG. 2A. The user interface of the portable item transfer container 120A is typically configured to facilitate the interactive sessions with the user. The user output devices 286 typically include a display 280 (e.g., a liquid crystal display, a touchscreen display, and/or the like) which is operatively coupled to the processor 210. In some embodiments, where the portable item transfer container 120A requests the user's signature (if needed), the display may also serve as a touchpad input device to input the user's signature via a stylus. Other output devices may include one or more LEDs or an audio speaker 282, both which may indicate to the user various steps of a user activity. The output devices 286 including the display 280 typically provide instructions and information to the user, regarding the user activity and steps associated with the user activity. The user interface may include any number of user input devices 240 allowing the portable item transfer container 120A to transmit/receive data to/from the user 102. A printer that can print paper receipts, for example, at the completion of a user activity, may also be incorporated into the portable item transfer container 120A. That said, the portable item transfer container 120A may also be configured to transmit electronic receipts to the user. For example, the container 120A may transmit an electronic receipt to the user device 104 via a NFC communication channel established using the contactless interface device 279.

In some embodiments, the user output device 286 is an interface headset (not illustrated), that is typically configured to be adorned by the user 102 and is operatively coupled to the portable item transfer container 120A via wireless communication channels. These wireless communication channels may be encrypted to ensure the security of user data. The interface headset is configured to provide augmented reality and virtual reality experiences to the user as the user is performing one or more user activities at the portable item transfer container 120A.

The portable item transfer container 120A typically includes an item storage unit 264 for storing physical items. The physical items may include cash and/or checks. The portable item transfer container 120A also typically includes an item transfer unit 262. The item transfer unit 262 is typically in operative mechanical/physical and/or electronic communication with the item storage unit 264 and is typically configured to dispense items stored in the item storage unit 264, receive items (e.g., from a user), and store received items in the item storage unit 264. For example, the item transfer unit 262 may include one or more cash dispensers and deposit mechanisms. The secure physical housing 260, the item transfer unit 262, the item storage unit 264 of the portable item transfer container 120A will be described in detail below.

As illustrated by FIG. 2A, the portable item transfer container 120A may further comprise an image capture device 250. The image capture device 250 typically comprises cameras and other audio, video and image capture devices. The image capture device 250 may comprise one or more components. In some embodiments, one or more components of the image capture device 250 may be located within the secure physical housing 260, located on or proximate to an external surface of the secure physical housing 260, within or proximate to walls of the secure physical housing 260, and/or at input and/or output portals of the secure physical housing 260. In some embodiments, the image capture device 250 is typically configured to capture images of items being deposited into the portable item transfer container 120A and/or withdrawn from the portable item transfer container 120A (for example, in the instances where the device 250 or the components of the device are located within the housing 260 or at the at input and/or output portals of the housing 260). The images captured by the image capture device 250 may be analyzed by the portable item transfer container 120A in order to identify specific items being withdrawn or deposited. By identifying specific items being withdrawn or deposited, the portable item transfer container 120A may be able to maintain an accurate inventory of items located in the item storage unit 264. In some embodiments, and/or in combination with the above embodiments, the image capture device 250 is also configured to capture authentication credentials of the user (e.g., by identifying the user for authentication or facial recognition purposes). Here, for instance, one or more components of the image capture device may be located on or proximate to an external surface of the secure physical housing 260.

In some embodiments, the portable item transfer container 120A further comprises sensor devices 290. In some embodiments, the processor 210 communicates with, transmits instructions, and/or receives signals from the sensor devices 290, in real-time for detecting the presence of the users or other individuals, detecting proximity of other portable item transfer containers, determining user location, capturing authentication credentials for the user, determining parameters associated with the user, determining current location when navigating from one location to another, capturing one or more parameters associated with the environment or physical location of the portable item transfer container 120A, and the like.

In some embodiments, the sensor devices 290 are position sensors configured to determine the position and/or location of the user 102, path/location markers within a facility, other individuals, objects/devices, or entities. As such, the sensor devices 290 may determine an absolute positon (for example, location/positioning coordinates) or a relative position (for example, with respect to the position of the portable item transfer container 120A, with respect to position of the user or another individual, with respect to a position/location marker in a facility, with respect to the sensor device 290 itself or a predetermined object and the like) of the user, individual, other portable item transfer containers, container portals, or another object. Here, in some embodiments, the sensor devices 290 are proximity sensors that are configured to determine the presence of the user, other portable item transfer containers, container portals, or another object (for example, location markers/identifiers within the facility location) within a predetermined proximity area. These sensor devices 290 may be contact type sensors that determine the presence of the user or object based on contact, or non-contact type sensors that detect distant users or objects. Typically, the sensor devices 290 comprise a first transducer that is configured to convert electrical energy into a proximity signal (for example, an electromagnetic wave, a sound wave, and the like) that is broadcast in a predetermined proximity area. The incidence of the proximity signal on physical users or objects within the proximity area results in a return signal/wave that is captured by the sensor devices 290. The return signal/wave is then converted to an electric signal by a second transducer of the sensor. This electric signal may be analyzed, in real-time, by the sensor devices 290, the portable item transfer container 120A, and/or the processing system 130, to determine the location of the user/container/portal and/or track movement of the user/container/portal. Here, the sensor devices 290 may be configured to perform modulation, demodulation, amplification and output switching of the proximity and return signals.

In some embodiments, the image capture device 250 is configured to capture images or surroundings of the container 120A, real time video feeds of the surroundings, and the like. The images and/or video streams provided by the image capture device 250 may be analyzed by the portable item transfer container 120A (for example, by the processor 210) to determine the presence and position of the user, resource distribution document denominations, other individuals or objects and their movement in proximity to the portable item transfer container 120A or the like. For example, these images and/or videos many then be analyzed, typically in real-time, to determine current location of the container 120A based on recognizing location markers or identifiers in the facility, and the like. Although described separately, it is understood that the image capture device 250 may be associated with the sensor devices 290. As such, sensors or sensor devices, as used herein, may refer to the various sensor devices described herein and the image capture devices described herein.

In some embodiments, the sensor devices 290 may include a positioning system 285, such as a geo-positioning system device. The position system 285 may provide location information (e.g., GPS coordinates) to the portable item transfer container 120A, and/or the processing system 130. This location information may then be used to aid the portable item transfer container 120A in determining its current location, determining authorization for a particular user activity and the like. As noted, the sensor devices 290 may also be configured to identify objects in the environment of the portable item transfer container 120A.

In some instances, the sensor devices 290 comprise biometric sensors for capturing parameters associated with the user, such as fingerprint scanners, voice recognition sensors, facial recognition sensors, and the like. These biometric sensors 290 are configured to retrieve, receive, analyze and or validate biometric credentials associated with the user. In this regard, the biometric sensors 290 may comprise optical sensors, ultrasonic sensors, and/or capacitance sensors. The biometric sensors may further comprise radio frequency, thermal, pressure, piezo-resistive/piezoelectric, microelectromechanical sensors, and the like.

Figure 2B:
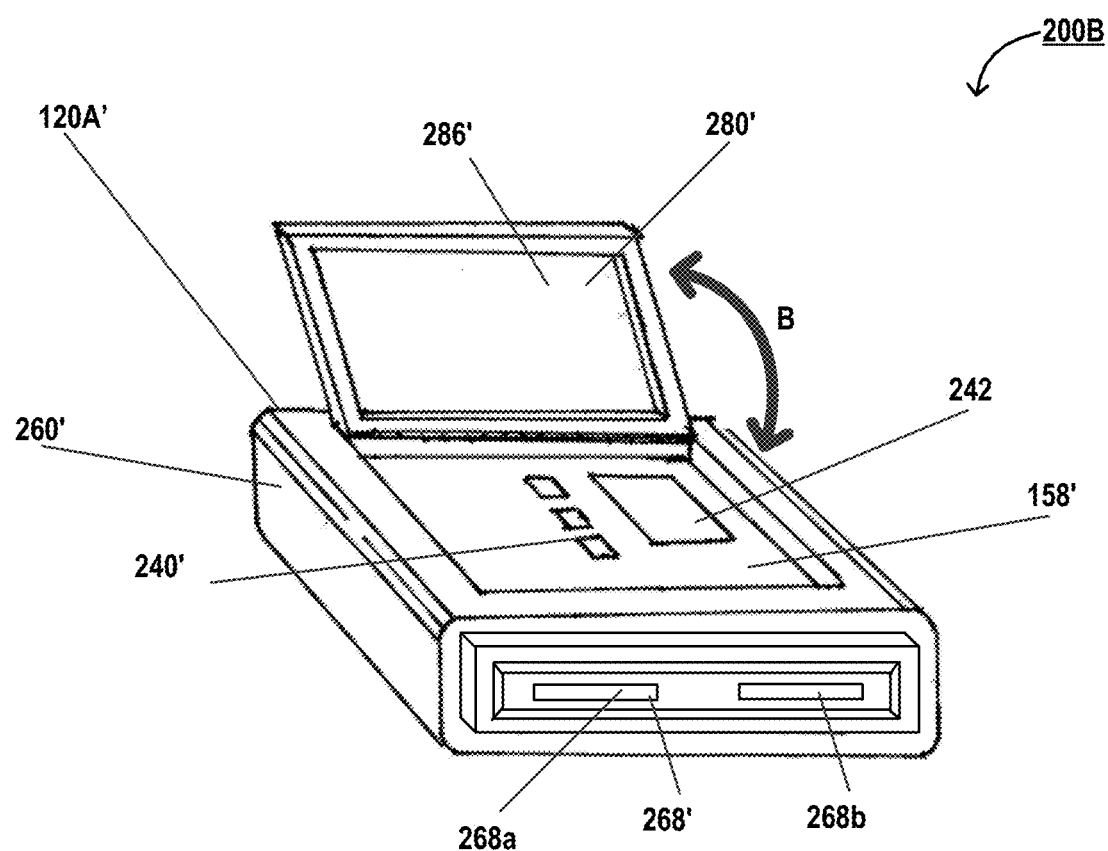
FIG. 2B illustrates a perspective view 200B of a portable item transfer container 120A, in accordance with an embodiment of the invention.

FIG. 2B illustrates a perspective view 200B of a portable item transfer container 120A, in accordance with some embodiments of the invention. The components, functions and features of the portable item transfer container 120A illustrated herein are similar to those described with respect to FIG. 2A. Specifically, FIG. 2B illustrates embodiments of the portable item transfer container 120A comprising a secure physical housing 260'.

The housing 260' is typically configured for physically separating an interior volume or cavity of housing from the external surroundings. The housing 260' is typically a rigid housing configured to withstand predetermined external stresses and strains and to provide tamper-proof protection for the contents stored in the cavity. In some embodiments, the conduit housing is manufactured from rigid materials that are typically strong enough to withstand predetermined impacts, stresses, strains, wear, buckling and flexure without adversely affecting its structural integrity. As such, the housing 260' may be manufactured out of suitable materials such as metals, alloys, plastics, composites, natural or synthetic materials, polymers and the like, or a combination thereof. Metallic materials may include suitable grades of stainless steel, carbon steels, other ferrous metals and alloys, aluminum and its alloys, tin, lead, and the like. Composite materials may include fiber-reinforced plastics, ceramic composites, metal matrices, metal composites, plywood, and the like.

The housing 260' typically encloses the cavity. In some embodiments, the housing 260' comprises a security portal or opening (not illustrated). Typically, the security portal is covered by a door with an internal lock, which when unlocked is configured to provide access into the cavity. The internal lock is configured such that only authorized personnel or associates of the entity are allowed access into the cavity, for example, for the purposes of retrieving deposited checks, replenishing one or more types of items that are depleted in the container, and the like. Typically, the authorized personnel would require to insert a physical key or transmit smart authentication credentials or authorization tokens using a suitable user device/security device to unlock the internal key and retract the door for accessing the cavity 266'.

Moreover, the item transfer unit 262' and the item storage unit 264' are typically located in the cavity, within the housing 260'. As discussed previously, the item storage unit 264' is configured to store and manage one or more physical items (e.g., cash and/or checks), and the item transfer unit 262' configured to dispense items stored in the item storage unit 264, receive items (e.g., from a user), and store received items in the item storage unit 264. The housing 260' typically includes one or more portals 268' or container portals 268' (e.g., a input portal and an output portal, a combined input/output portal, a check input portal, and/or the like) configured to receive physical items into the cavity and the item transfer unit 262' in particular, and/or dispense one or more items out of the cavity through an opening of the portal. For example, FIG. 2B illustrates, an embodiment of the portable item transfer container 120A with an input portal 268a for receiving one or more items into the housing 260' and an output portal 268b for dispensing one or more items.

As further illustrated, in some embodiments, the portable item transfer container 120A further comprises user interface devices, configured for receiving authentication credentials from the user and configured for facilitating an interactive user session and execution of one or more steps of a user activity. The user interface devices may comprise an user authentication device 242 such as a biometric configured for receiving biometric credentials of the user or a magnetic card reader configured for reading a magnetic card strip associated with the user. The user interface devices may comprise user input devices 240' such as a keypad configured for receiving user input. The user interface devices may comprise user output devices 286' such as a display screen 280'. The display screen 280' illustrated in FIG. 2B (e.g., a liquid crystal display, a touchscreen display, and/or the like) may also serve as an input device to receive user input. As indicated by the direction B, the display screen 280' may be foldable to provide a contiguous outer surface to the housing 260'.

The item transfer unit in this embodiment comprises an input receptacle and an output receptacle. The input receptacle is configured to store one or more received items 10, for example, in a stack. The output receptacle is configured to store or hold, for example temporarily, one or more items for dispensing through the output portal. The item transfer unit comprises an input mechanism for receiving one or more items via the input portal, and for moving the received items to and storing the items at the input receptacle and/or the item storage unit 264. In this exemplary illustration of the embodiment, the input mechanism is illustrated as comprising a plurality of roller pairs for receiving, moving and storing the items. The item transfer unit comprises a transfer mechanism for transferring/moving items from the input receptacle to the output receptacle and an output mechanism for dispensing one or more items from the output receptacle via the output portal. In this exemplary illustration of the embodiment, the transfer mechanism is illustrated as comprising a plurality of roller pairs and the output mechanism is illustrated as comprising a plurality of roller pairs. Although illustrated as using rollers, it is understood that the input, transfer and output mechanisms of the item transfer unit may comprise other mechanisms such as robotic arms, suction cups, conveyor systems, cams, actuators, levers, linkages and the like, in addition to and/or instead of the roller pairs for moving, orienting and storing the items. Moreover, the secure physical housing 260' comprises one or more image capture devices.

The functioning of the input mechanism of the item transfer unit will now be described. The user may provide one or more items for storage via the input portal. For example, the user may provide a plurality items comprising one or more checks, one or more bills of type A and one or more bills of type B, either one after another or together in a randomly ordered stack. The input mechanism may then direct the received items into the input receptacle along the input direction I, via the roller pairs. The system may then scan the received items at the input receptacle, for example, one after another, and update an item inventory of the container based on identifying the type and value of the received items. Next, the input mechanism may transport items of a predetermined type (e.g., items that are not likely to be dispensed to a user once processed, checks, bills of a particular type, checks, bills of a particular type, and the like) to the item storage unit using the roller pairs along the input direction I. Continuing with the previous example of the plurality of input items, the system may request the user to provide the items one after another. Based on receiving a first item of a bill of type A, the system may direct the item to the input receptacle and scan the item using the image capture device. The system may then update the item inventory. Next the system may receive second item of a check from the user. The system may move the check, via the rollers, into the input receptacle such that the check is above the first item of bill type A in the receptacle. In response to determining the item is a predetermined type of item (e.g., cash), via the image capture device, the system may further move the check to the spring loaded item storage unit along the input direction I, using the roller pairs. Here, the system may further maintain a input receptacle inventory and an item storage unit inventory indicating the specific items stored in the receptacle and the storage unit, and the order in which they are stored in the stack. In this example, the input receptacle inventory would indicate the bill of type A and the item storage unit inventory would indicate the check. Next, the container may receive a third item of a bill of type B, direct the item to the receptacle, scan the item using the image capture device, and update the item inventory of container and the input receptacle inventory. Similarly the system may receive and store all of the plurality of items that the user seeks to deposit.

For dispensing the items, the system may receive a request from a user to dispense one or more items, such as a withdraw of physical resource distribution documents. The system may then engage the item holding device such that the first spring biased end is proximate the receptacle. Next, the system may move the user requested items from the corresponding item storage units in the output direction θ, either sequentially or in groups, and place them in the receptacle. Here, the system may also capture images of the items using the image capture device to ensure that the items match the user request. Once all the user requested items have been gathered/placed in the receptacle and the item inventory has been updated, the system may rotate the item holding device such that the second roller end engages the items in receptacle and subsequently dispense the user requested items from the portal. Continuing with the previous example, the system may retrieve items of type A from the item storage unit and 2 items of type B from the item storage unit, gather them at the receptacle and dispense them via the portal.

Figure 3:
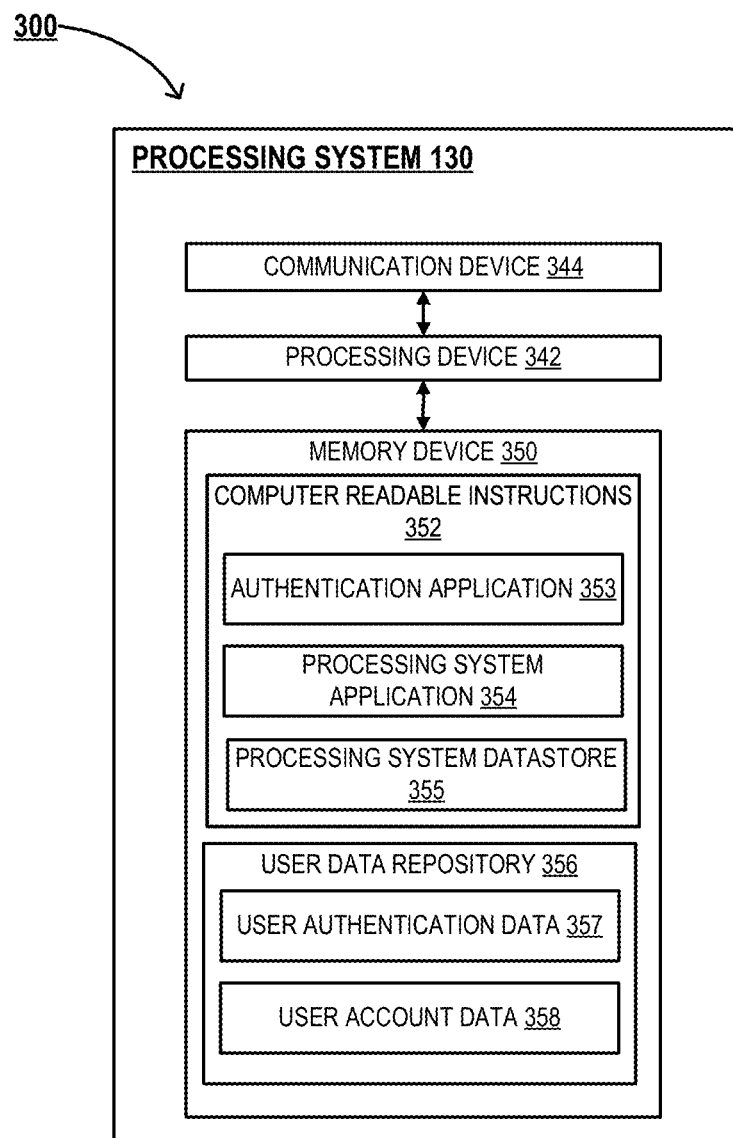
FIG. 3 illustrates a block diagram 300 of a processing system, in accordance with an embodiment of the invention.

FIG. 3 illustrates a block diagram 300 of the processing system 130, in accordance with some embodiments of the invention. As illustrated in FIG. 3, the processing system 130 may include a communication device 344, a processing device 342, and a memory device 350 having an authentication application/module 353, a processing system application 354 and a processing system datastore 355 stored therein. As shown, the processing device 342 is operatively connected to and is configured to control and cause the communication device 344, and the memory device 350 to perform one or more functions. Furthermore, the processing device 342 may be configured to control and cause the processor 210 of the portable item transfer container 120A to perform one or more functions. In some embodiments, the authentication application 353 and/or the processing system application 354 comprises computer readable instructions that when executed by the processing device 342 cause the processing device 342 to perform one or more functions and/or transmit control instructions to the portable item transfer container 120A, the ledger database 118, the third party system 116, and/or the communication device 344. It will be understood that the authentication application 353 and/or the processing system application 354 may be executable to initiate, perform, complete, and/or facilitate one or more portions of any embodiments described and/or contemplated herein, and specifically embodiments directed to user activities. The authentication application 353 may comprise executable instructions associated with one or more authentication steps of user activities, and may be embodied within the processing system application 354 in some instances. In some embodiments, the authentication application 353 is similar to the authentication module 234 described previously.

The processing system 130 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like. Moreover, the processing system(s) 130 may be located at the geographic facility location of the container 120A (or within a predetermined geographic distance of the container 120A), and/or remotely with respect to the geographic facility location of the container 120A.

The communication device 344 may generally include a modem, server, transceiver, and/or other devices for communicating with other devices on the network 101. The network communication device 344 may be a communication interface having one or more communication devices configured to communicate with one or more other devices on the network 101, such as the portable item transfer container 120A and other processing systems, data systems, etc.

Additionally, referring to processing system 130 illustrated in FIG. 3, the processing device 342 may generally refer to a device or combination of devices having circuitry used for implementing the communication and/or logic functions of the processing system 130. For example, the processing device 342 may include a control unit, a digital signal processor device, a microprocessor device, and various analog-to-digital converters, digital-to-analog converters, and other support circuits and/or combinations of the foregoing. Control and signal processing functions of the system 130 may be allocated between these processing devices according to their respective capabilities. The processing device 342 may further include functionality to operate one or more software programs based on computer-executable program code 352 thereof, which may be stored in a memory device 350, such as the processing system application 354 and the authentication application 353. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 342 may be configured to use the network communication interface of the communication device 344 to transmit and/or receive data and/or commands to and/or from the other devices/systems connected to the network 101.

Furthermore, a "user interface" (not illustrated) may be associated with the processing system 130 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the processing system, for example on one or more workstations connected to the system 130, the user device 104, or the display device 280 of the portable item transfer container 120A. As another example, the user interface may be provided on the portable item transfer container 120A that may be controlled by the processing system 130 either directly or via the processor 210 of the portable item transfer container 120A.

The memory device 350 within the processing system 130 may generally refer to a device or combination of devices that store one or more forms of computer-readable media for storing data and/or computer-executable program code/instructions. For example, the memory device 350 may include any computer memory that provides an actual or virtual space to temporarily or permanently store data and/or commands provided to the processing device 342 when it carries out its functions described herein. The processing system 130 may be used by a third party/entity to interact with the portable item transfer container 120A, based on providing requisite authorization. The processing system 130 may further comprise a user data repository 356 comprising user authentication data 357 and user account data 358. The processing system 130 may utilize the authentication data 357 to validate user authentication credentials. Furthermore, the account data 358 may reflect the current account data of the user.

Figure 4:
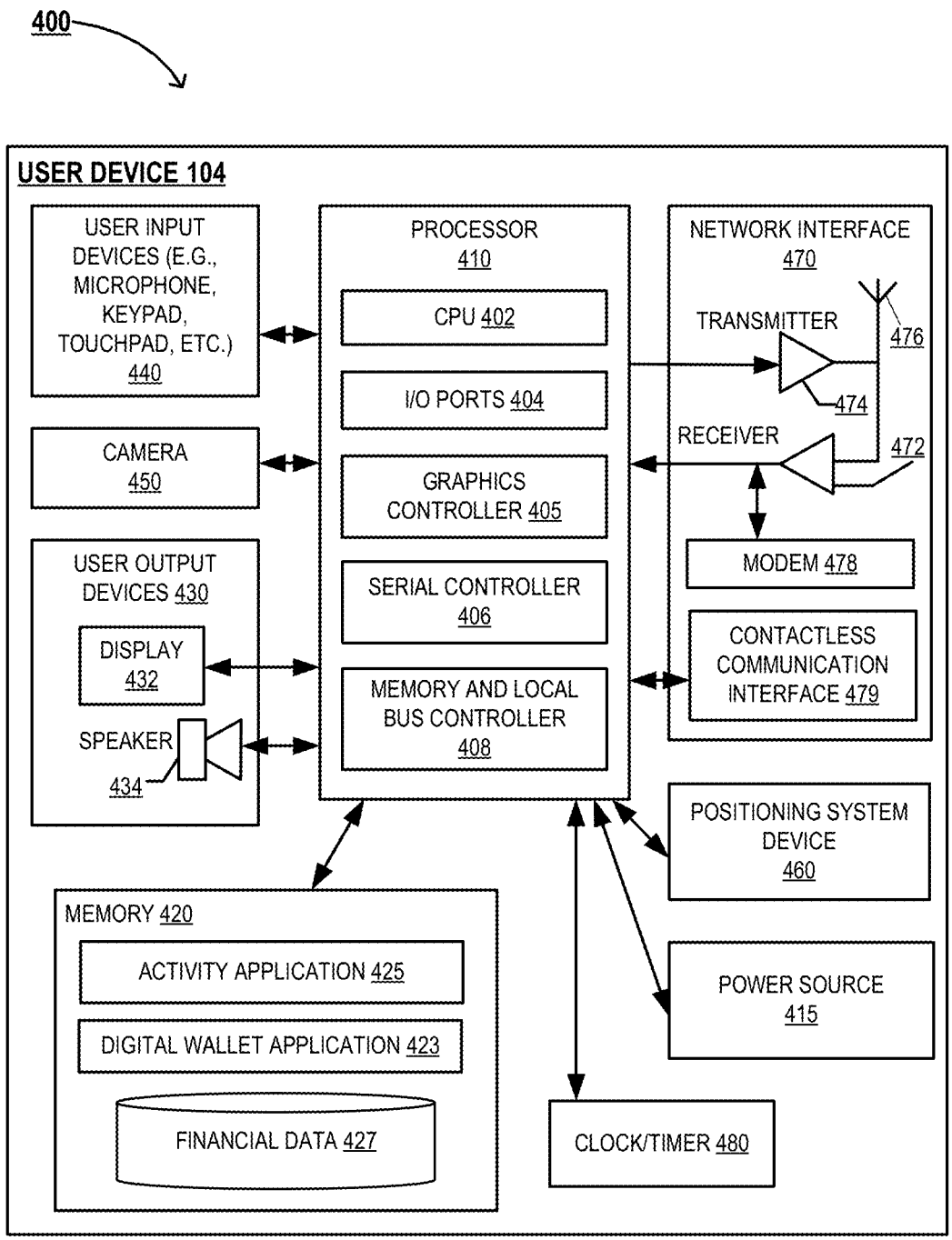
FIG. 4 illustrates a block diagram 400 of a user device, in accordance with an embodiment of the invention.

FIG. 4 illustrates a block diagram 400 of the user device 104, such as a user mobile device, in accordance with some embodiments of the invention. A "mobile device" 104 may be any mobile communication device, such as a cellular telecommunications device (i.e., a cell phone or mobile phone), personal digital assistant (PDA), a mobile Internet accessing device, the computer system of the user container, or another device including, but not limited to portable digital assistants (PDAs), pagers, mobile televisions, gaming devices, laptop computers, cameras, video recorders, audio/ video player, radio, GPS devices, any combination of the aforementioned devices.

The mobile device 104 may generally include a processing device or processor 410 communicably coupled to devices such as, a memory device 420, user output devices 430 (for example, a user display device 432, or a speaker 434), user input devices 440 (such as a microphone, keypad, touchpad, touch screen, and the like), a communication device or network interface device 470, a power source 415, a clock or other timer 480, a visual capture device such as a camera 450, a positioning system device 460, such as a geo-positioning system device like a GPS device, an accelerometer, and the like, one or more chips, and the like. The processor 410 may further include a central processing unit 402, input/output (I/O) port controllers 404, a graphics controller 405, a serial bus controller 406 and a memory and local bus controller 408.

The processor 410 may include functionality to operate one or more software programs or applications, which may be stored in the memory device 420. For example, the processor 410 may be capable of operating applications such as the activity application 425, a digital wallet application 423, or a web browser application. The activity application 425 may then allow the mobile device 104 to transmit and receive data and instructions from the portable item transfer container 120A (for example, via wireless communication or NFC channels), data and instructions from the processing system 130, web content, such as, for example, location-based content and/or other web page content, according to a Wireless Application Protocol (WAP), Hypertext Transfer Protocol (HTTP), and/or the like.

The digital wallet application 423 and the financial data module 427, together may include the necessary circuitry to provide token storage and transmission functionality, transmitter device signal encoding and decoding functionality to the mobile device 104, for secure transmission of financial and authentication credential tokens via the contactless communication interface 479 to the portable item transfer container 120A. Generally, the financial data module 427 may be a chip in the form of an integrated circuit, a microprocessor, a system-on-a-chip, a microcontroller, or the like. Of note, while FIG. 4 illustrates the financial data module 427 as an element within the mobile device 104, it will be apparent to those skilled in the art that the financial data module 427 functionality may be incorporated separately, within other elements in the mobile device 104, or may be included in a removable storage device such as an SD card or the like.

The processor 410 may be configured to use the network interface device 470 to communicate with one or more other devices on a network 101 such as, but not limited to the portable item transfer container 120A and the processing system 130. In this regard, the network interface device 470 may include an antenna 476 operatively coupled to a transmitter 474 and a receiver 472 (together a "transceiver"), modem 478 and a contactless communication interface 479. The processor 410 may be configured to provide signals to and receive signals from the transmitter 474 and receiver 472, respectively. The signals may include signaling information in accordance with the air interface standard of the applicable BLE standard, cellular system of the wireless telephone network and the like, that may be part of the network 101. In this regard, the mobile device 104 may be configured to operate with one or more air interface standards, communication protocols, modulation types, and access types. By way of illustration, the mobile device 104 may be configured to operate in accordance with any of a number of first, second, third, and/or fourth-generation communication protocols and/or the like.

The network interface device 470 or communication device 470 may also include a user activity interface presented in user output devices 430 in order to allow a user 102 to execute some or all of processes described herein. The application interface may have access to the hardware, for example, the transceiver, and software previously described with respect to the network interface device 470. Furthermore, the application interface may have the ability to connect to and communicate with an external data storage on a separate system within the network 101. As described above, the mobile device 104 includes a display device 432 having a user interface that includes user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440, which may allow the mobile device 104 to receive data from the user 102, may include any of a number of devices allowing the mobile device 104 to receive data from a user 102, such as a keypad, keyboard, touchscreen, touchpad, microphone, mouse, joystick, other pointer device, button, soft key, and/or other input device(s).

The mobile device 104 may further include a power source 415. Generally, the power source 415 is a device that supplies electrical energy to an electrical load. In some embodiment, power source 415 may convert a form of energy such as solar energy, chemical energy, mechanical energy, and the like, to electrical energy. Generally, the power source 415 in a mobile device 104 may be a battery, such as a lithium battery, a nickel-metal hydride battery, or the like, that is used for powering various circuits, for example, the transceiver circuit, and other devices that are used to operate the mobile device 104. Alternatively, the power source 415 may be a power adapter that can connect a power supply from a power outlet to the mobile device 104. In such embodiments, a power adapter may be classified as a power source "in" the mobile device 104.

The mobile device 104 may also include a memory buffer, cache memory or temporary memory device operatively coupled to the processor 410. Typically, one or more applications 425 and 423, are loaded into the temporarily memory during use. As used herein, memory may include any computer readable medium configured to store data, code, or other information. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

Figure 5:
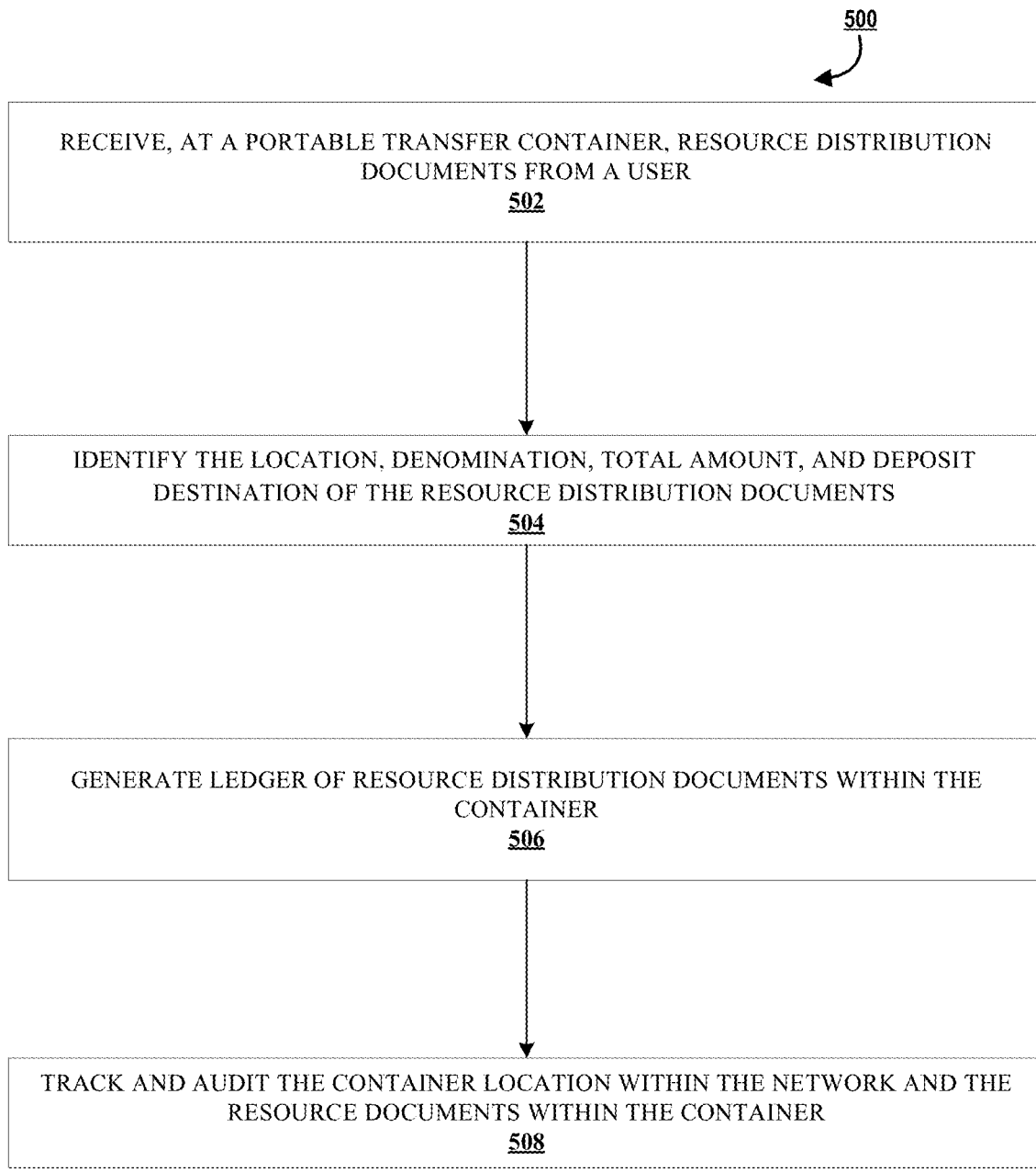
FIG. 5 illustrates a high level process flow 500 for receiving and documenting resource distribution documents at a portable item transfer container, in accordance with an embodiment of the invention.

FIG. 5 illustrates a high level process flow 500 for receiving and documenting resource distribution documents at a portable item transfer container, in accordance with an embodiment of the invention. As illustrated in block 502, the process 500 is initiated by receiving, at a portable item transfer container, resource distribution documents from a user. In this way, the user may log into or otherwise authorize the user at the container. The user may then distribution resource distribution documents into the container. The user may do so to deposit the resource distribution documents into an account, exchange the denominations of the resource distribution documents, or the like. The user may provide the container with resource distribution documents at an entity location, at a financial institution location, or another network location where a container may be found.

In addition to depositing or withdrawing items, a user may check an account balance, print an account statement, transfer funds between accounts, or perform another activity/transaction during an interactive session with the portable item transfer container. In some embodiments, the user may employ the user input devices of the portable item transfer container in order to initiate the activity request and otherwise interact with the portable item transfer container. For example, the user may initiate an activity request by inserting or swiping a credit or debit card using a card reader of the portable item transfer container. Alternatively, the user may employ the user device to send the activity request to the portable item transfer container and to otherwise interact with the portable item transfer container.

As illustrated in block 504, the system may identify information about the deposit of resource distribution documents into the container. As such, the system, via the ledger may identify the authorized user, the location of the deposit, the resource distribution document total deposited, the denominations of the resource distribution documents deposited, an end point for the resource distribution documents deposited (such as a deposit at an account, recycle the resource distribution documents, transfer the resource distribution documents to another user, or the like). The system may identify this information about the deposit and store the data on the ledger.

Upon deposit, one or more images of the deposit are captured (e.g., by the image capture device) of each of the items that the user is depositing. For example, if the user is depositing cash or checks, the image capture device may take a picture of the front and back of each check or bill. The images are typically captured either as the items are inserted into the item transfer unit or as the items are internally transferred to the item storage unit. The image(s) of each of the deposited items is processed (e.g., by the portable item transfer container) in order to identify each of the items being deposited. For example, the portable item transfer container may identify whether a deposited item is cash or a check, as well as the value of the deposited item.

Various types of processing techniques may be employed to identify the exact items deposited. In many instances the items deposited may include cash and/or checks. Accordingly, optical character recognition (OCR) processes may be applied to at least a portion of the images. The OCR processes enables the portable item transfer container to convert handwritten or printed text and other symbols in the check images to other formats such as text files and/or metadata, which can then be used to identify the value of the check deposited (as well as other information contained on the check) or the denomination of an inserted bill. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters. In some embodiments, other processing techniques such as intelligent word recognition (IWR) and intelligent character recognition (ICR) may be used to recognize and extract handwritten text. In some embodiments, the OCR process includes location fields for determining the position of data on an image. Based on the position of the data, the portable item transfer container can identify the type of data in the location fields to aid in character recognition. For example, an OCR engine may determine that text identified in the upper right portion of a check image corresponds to a check number. The location fields can be defined using any number of techniques. In some embodiments, the location fields are defined using heuristics. The heuristics may be embodied in rules that are applied by the portable item transfer container for determining approximate location. In other embodiments, the portable item transfer container defines the location fields by separating the portions and/or elements of an image into quadrants. As referred to herein, the term quadrant is used broadly to describe the process of differentiating elements of an image by separating portions and/or elements of the image of the image into sectors in order to define the location fields. These sectors may be identified using a two-dimensional coordinate system or any other system that can be used for determining the location of the sectors. In many instances, each sector will be rectangular in shape. In some embodiments, the portable item transfer container identifies each portion of the image using a plurality of quadrants. In such an embodiment, the portable item transfer container may further analyze each quadrant using the OCR algorithms in order to determine whether each quadrant has valuable or useful information. Generally, valuable or useful information may relate to any data or information that may be used for processing of the deposited item, used for identifying the item, and the like. Once the portable item transfer container determines the quadrants of the image having valuable and/or useful information, the portable item transfer container can extract the identified quadrants together with the information from the image for analysis (and optionally, storage). The quadrants may be extracted as metadata, text, or code representing the contents of the quadrant. In some embodiments, the quadrants of the image that are not identified as having valuable and/or useful information are not extracted from the image.

In some embodiments, the user may wish to withdraw funds of a certain amount from the container. The portable item transfer container may determine that it has enough cash to fulfill the user's request, as well as sufficient quantities of resource distribution document denominations to precisely meet the user's request (e.g., if the user wishes to withdraw $40, but the portable item transfer container only has $100 bills, then the portable item transfer container would be unable to fulfill the user's request). The container typically transmits (e.g., via the communication device 270) a withdrawal authorization request to the processing system. Once the processing system receives the withdrawal authorization request from the portable item transfer container, the processing system typically determines whether the user is authorized to withdraw the items that the user has requested to withdraw. If the user is authorized to withdraw the items, then the processing system will typically transmit an authorization to the portable item transfer container. However, if the user is not authorized to withdraw the items, then the processing system will typically notify the portable item transfer container that the user is not authorized to withdraw the items. For example, if the user has requested to withdraw cash from the portable item transfer container, the processing system will typically determine whether an account of the user (e.g., a checking account) has enough funds to meet the request. If the user has enough funds, the processing system may then transmit an authorization to the portable item transfer container. In addition, the processing system may decrease a balance of an account of the user by the amount to be withdrawn by the user. That said, if the user does not have enough funds, then the processing system 130 may notify the portable item transfer container that the user is not authorized to withdraw the requested cash.

In some embodiments, the container further comprises one or more secure dispensing containers located within the secure physical housing of the container, wherein the dispensing containers are configured to hold one or more items. Typically, the items are stored in the secure dispensing container such that the items may be retrieved from the secure dispensing container only after validation or authentication credentials received from a recipient user, or after unlocking the dispensing container using a predetermined physical key, and/or electronic key or token. In such embodiments, dispensing the requested items via the item transfer unit comprises placing the items to be dispensed (e.g., cash requested by the user) in a secure dispensing container of the container, locking or securing the dispensing container, and dispensing the locked dispensing container containing the items to a user, another recipient or a dispensing location (e.g., via an output portal of the housing). After retrieving the dispensed secure dispensing container having the items, the user or recipient may unlock the secure dispensing container after providing requisite authentication credentials to withdraw items contained therein.

As illustrated in block 506, the process 500 continues by generating a ledger of the resource distribution documents within the container. The ledger may track the information about the specific deposit. Furthermore, one or more additional deposits may be made into the container from one or more other users. The information for each deposit or withdraw from the container is stored in the ledger. The information for each container across a network is stored in real-time on the generated ledger. In this way, each container is connected via a network to the ledger for real-time updating of the ledger to know the resource distribution documents amounts, resource distribution documents denominations, and the like associated with each container across the network. In this way, the container updates the item inventory to reflect that the items requested by the user have been withdrawn. For example, if the item inventory previously showed that the item storage unit contained ten $100 bills and user subsequently withdraws two $100 bills, then the portable item transfer container would update the item inventory to indicate that the item storage unit now contains eight $100 bills.

Next, as illustrated in block 508, the process 500 continues by tracking and auditing the container location within the network and the resource documents within the container. In this way, once the ledger is updated with the resource distribution document deposit in the container, the overall ledger across the network is updated. As such, the ledger comprises information about each container, the resource distribution documents in each container, the specific denominations within each container, the location of the container, the accounts or end destination of the resource distribution documents, and the like.

Based on identify each deposited/received item, the portable item transfer container updates the item inventory and ledger to reflect that the items have been deposited/received. For example, if the user deposits three $100 bills, the system may update the item ledger by increasing the quantity of stored $100 bills by three. In some embodiments, the portable item transfer container may further transmit, in real time, the scanned image of the deposited item to the processing system for maintaining a centralized ledger record of the item.

The portable item transfer container transmits (e.g., via the communication interface) a storage notification to the processing system indicating that the items have been deposited/stored by the user. In addition, to notifying the processing system indicating that the items have been deposited by the user, the portable item transfer container provide any other data to the processing system that the processing system uses to further process the deposit by the user. For example, the portable item transfer container may provide the processing system with the value (either of individual items or the aggregate value of all items) of the deposited items, the identity of the deposited items, images of the deposited items, data extracted from the images (e.g., bill denomination, check amount, or check payor information, such as the name of the payor and the payor's account information), an account identified by the user to which the user would like the deposit credited, and/or the like. For example, if the user deposits cash and one or more checks in the portable item transfer container, the processing system may then increase an account balance of an account of the user by the aggregate amount of the deposited cash and checks.

Using the ledger, the system may be able to transmit resource distribution documents across various entities for distribution of the resource distribution documents to various users or entities across the network without human interaction. As such, the system completely eliminates user physical interaction with physical resource documents. A user may initially deposit the physical resources into a portable transfer container, the system may count the amount of resources, delegate an owner or owner account associated with those resources, and place the physical resource into a specific cassette associate with the portable transfer container. As more resources are placed into the container by one or more users the system generates a ledger of the container, physical resources within the container, denominations of resources within the container, and owners of the resources within the container. As such, with the ledger, the container may be universally used by one or more users or entities across the supply chain network. As such, the container may be portable and may be exchanged with other entities, other containers, recycled, or provided to vault storage. In this way, the system may also track the physical resource documents in the containers without introducing any user interaction with the physical resource documents.

In some embodiments, the containers may be user to transfer physical resource documents, store physical resource documents, safely exchange denominations, service cash registers or ATM or the like.

Figure 6:
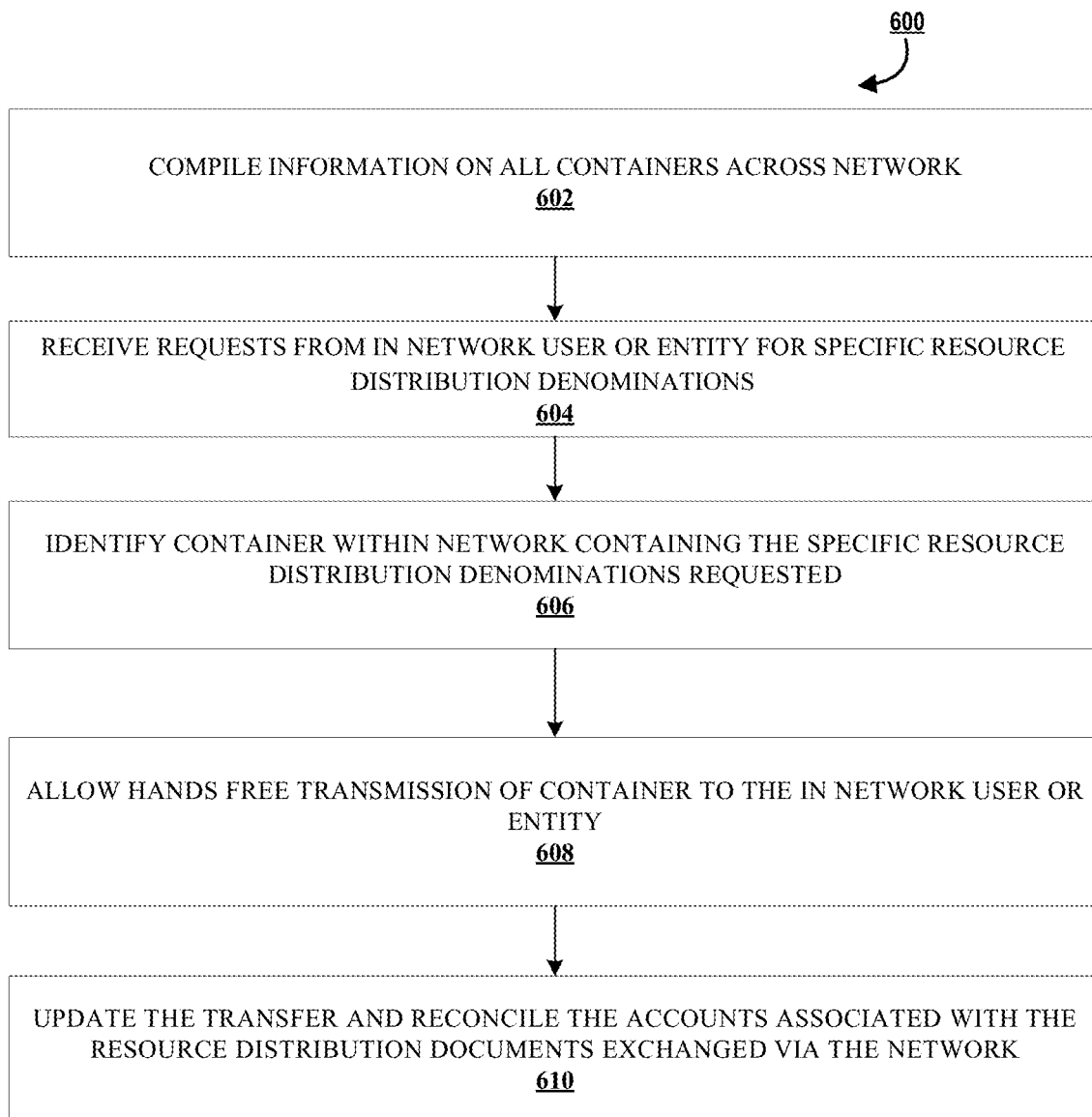
FIG. 6 illustrates a high level process flow 600 for processing an activity or exchange request for resource distribution documents, in accordance with an embodiment of the invention.

FIG. 6 illustrates a high level process flow 600 for processing an activity or exchange request for resource distribution documents, in accordance with an embodiment of the invention. As illustrated in block 602, the process 600 is initiated by compiling information on all containers across the network into the ledger. In this way, the system has information about the resource distribution documents that are in each container across the network. This allows for the system to manipulate and reallocate resource distribution documents and various denominations.

As illustrated in block 604, the process 600 continues by receiving a request from a user or entity within the network for specific resource distribution denominations or a resource distribution document withdraw amount. As such, a user may request to receive resource distribution documents or receive a specific denomination of resource distribution documents. The request may come from a user device, another container, or the like from a user interface on one of those devices. The request may come from an authorized user of the network.

Next, as illustrated in block 606, the process 600 continues by identifying containers within the network that contains the specific resource distribution documents or resource distribution documents dominations requested. Once identified, the system may either replace or exchange the containers across the network. As such, allowing for the elimination of user physical interaction with the resource distribution documents, instead the system allows a user to replace one container with another container that the system knows has the specific resource distribution documents requested. As such, as illustrated in block 608, allowing for a completely hands free transmission of a container from one user to the other within a network.

In addition to the above, in some instances, the portable item transfer container is typically configured to modify the activities that a user can perform based on a current network connectivity of the container (e.g., connectivity of the communication channel between the container and the processing system) and/or based on determining that real-time operative communication with the processing system cannot be established (e.g., temporary loss of connectivity, predicted loss of connectivity at a particular geographic location, and the like). Moreover, in some instances, the container is configured to update user information (e.g., user account information or balances of a plurality of individuals associated with the entity location of the container) stored locally in the memory of the container with the most current information when the container is at a first location with the desired connectivity, (i) before moving to another second location with inferior connectivity, (ii) based on anticipating that another second location of the next user activity typically does not have the predetermined connectivity (e.g., by analyzing prior connectivity data of the container), (iii) based on identifying imminent changes to the communication channel or connectivity of the container, and/or (iv) periodically.

Specifically, based on determining that the connectivity (e.g., bandwidth, speed, bit rate, and the like) of the communication channel between the container and the processing system is below a predetermined threshold or based on determining that operative communication between the container and the processing system has ceased, the container may modify the activities that a user can perform. For example, a user may be authorized to withdraw a first amount A at a particular location L. However, based on determining that the container is no longer in operative communication with the processing system at the location L, (i) the container may allow the user to withdraw a predetermined threshold limit amount T, lesser than the amount A, (ii) the container may allow the user to withdraw the amount A based on identifying that the user previously deposited at least the amount A in the container, within a preceding predetermined time interval, and/or (iii) the container may allow the user to withdraw the amount A based on identifying that the user account has a balance of at least the amount A (e.g., by analyzing the locally stored updated user information that was updated within a preceding predetermined time interval). That said, in some instances, based on determining that the connectivity (e.g., bandwidth, speed, bit rate, and the like) of the communication channel between the container and the processing system is below a predetermined threshold or based on determining that operative communication between the container and the processing system has ceased, the portable container may identify another container that has the requisite connectivity or operative communication with the processing system. The container may then establish operative communication or a communication link with the processing system via the container.

Finally, as illustrated in block 610 the process 600 is finalized by updating the transfer and reconciling the accounts associated with the resource distribution documents exchanged via the network.

Figure 7:
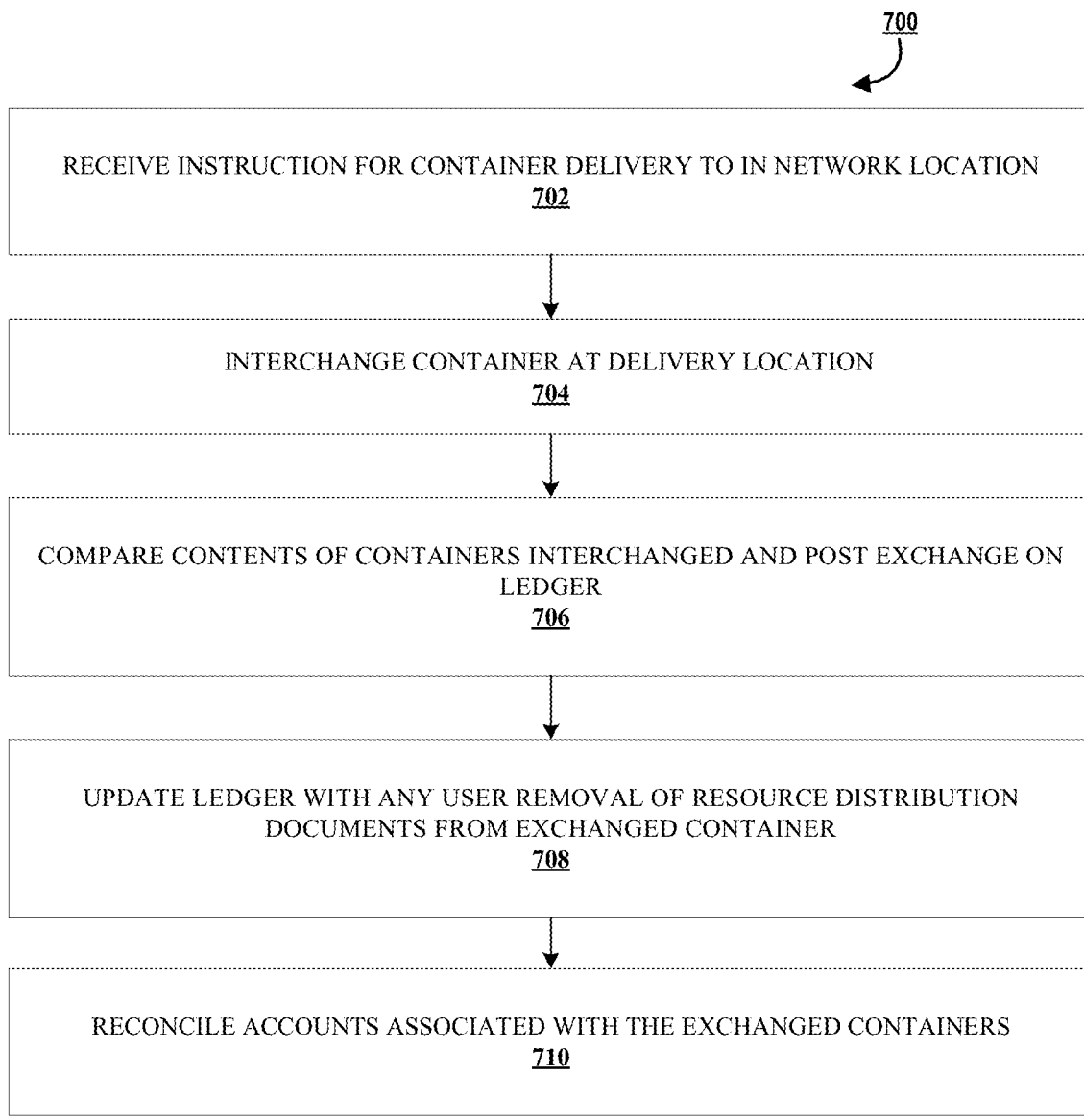
FIG. 7 illustrates a high level process flow 700 for processing an activity or exchange request across in network entities, in accordance with an embodiment of the invention.

FIG. 7 illustrates a high level process flow 700 for processing an activity or exchange request across in network entities, in accordance with an embodiment of the invention. As illustrated in block 702, the process 700 is initiated by receiving instructions for container delivery to in network locations. These instructions may be received from a user via a user device, entity device, or a container. The instructions may be for a withdraw of resource distribution documents from the container, a request for a container with specific denominations of resource distribution documents, a general request for a container containing resource distribution documents, or the like.

Next, the system may identify one or more containers that have the appropriate amount of resource distribution documents or the appropriate denominations of resource distribution documents as the request within the network. As such, a container may be identified that contains the appropriate amount and denominations within the network and within a geographical area. The system may schedule a transfer of that container to the requested site.

Next, as illustrated in block 704, the process continues to interchange the container at the delivery location with the requested container. As such, the container provides a universal fit at the requested site with the appropriate denominations of resource distribution documents.

As illustrated in block 706, the process 700 continues by comparing the contents of the interchanged containers and posting the exchange of the containers on the ledger. In this way, the resource distribution documents in both containers are accounted for and logged to appropriate accounts. However, this also allows for quick interchanging of resource distribution document needs across users, so that they are real-time transitions with no delay and no human intervention. Furthermore, as illustrated in block 708, the process 700 continues by updating the ledger with the exchange and further updating the ledger when any addition or removal of resource distribution documents occur from the newly exchanged container.

Finally, as illustrated in block 710, the process 700 is completed upon reconciliation of the accounts associated with the exchanged containers.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for providing a network of portable transfer containers, the system comprising;
    a memory device with computer-readable program code stored thereon;
    a communication device linking the portable resource distribution containers;
    a processing device operatively coupled to the memory device and the communication device, wherein the processing device is configured to execute the computer-readable program code to:
        generate multiple portable transfer containers, wherein a portable transfer container is configured to store resource distribution documents, dispense resource distribution documents, and receive resource distribution documents;
        communicable linking the multiple portable transfer containers across a network to a centralized ledger database;
        identify an amount, denomination, and directive destination for resource distribution documents received at a portable transfer container of the multiple portable transfer containers across the network;
        compile, in real-time, the amount, denomination, and directive destination for resource distribution documents received at the multiple portable transfer containers via the communicable linage;
        receive a request for a specific denomination of resource distribution documents from a user with the network;
        identify a portable transfer container with the denomination of the request and allow for transmission of the identified portable transfer container to a requestor of the request; and
        exchange the portable transfer container at the requestor with the identified portable transfer container.

2. The system of claim 1, wherein the portable transfer container comprising:
    a storage unit;
    a resource distribution document transfer unit configured to dispense resource distribution documents and receive resource distribution documents;
    a user interface, wherein the user interface is configured for receiving activity request from the user;
    an image capture device;
    a communication device;
    a memory; and
    a processor.

3. The system of claim 1, wherein receiving resource distribution documents from a user at a portable transfer container further comprises:
    authenticating an identity of the user; and
    comparing an authorized region of the user and a location of the portable transfer container and determining that the location of the portable item transfer container is within the authorized region of the user.

4. The system of claim 1, further comprising receiving resource distribution documents from a user at the portable transfer container, wherein the user is depositing the resource distribution documents.

5. The system of claim 1, further comprising withdrawing resource distribution documents from the portable transfer container for a user authorized to withdraw resource distribution documents.

6. The system of claim 1, wherein identifying an amount, denomination, and directive destination for the received resource distribution documents further comprises taking an image of the resource distribution documents as the resource distribution documents are being received and withdrawn at the portable transfer container.

7. The system of claim 1, wherein exchanging the portable transfer container at the requestor with the identified portable transfer container further comprises updating the ledger with the exchange and reconciling accounts associated with the exchange and the portable transfer container.

8. A computer program product for providing a network of portable transfer containers, the computer program product comprising at least one non-transitory computer-readable medium having computer-readable program code portions embodied therein, the computer-readable program code portions comprising:
    an executable portion configured for generating multiple portable transfer containers, wherein a portable transfer container is configured to store resource distribution documents, dispense resource distribution documents, and receive resource distribution documents;
    an executable portion configured for communicable linking the multiple portable transfer containers across a network to a centralized ledger database;
    an executable portion configured for identifying an amount, denomination, and directive destination for resource distribution documents received at a portable transfer container of the multiple portable transfer containers across the network;
    an executable portion configured for compiling, in real-time, the amount, denomination, and directive destination for resource distribution documents received at the multiple portable transfer containers via the communicable linage;
    an executable portion configured for receiving a request for a specific denomination of resource distribution documents from a user with the network;
    an executable portion configured for identifying a portable transfer container with the denomination of the request and allow for transmission of the identified portable transfer container to a requestor of the request; and
    an executable portion configured for exchanging the portable transfer container at the requestor with the identified portable transfer container.

9. The computer program product of claim 8, wherein receiving resource distribution documents from a user at a portable transfer container further comprises:

authenticating an identity of the user; and comparing an authorized region of the user and a location of the portable transfer container and determining that the location of the portable item transfer container is within the authorized region of the user.

10. The computer program product of claim 8, further comprising an executable portion configured for receiving resource distribution documents from a user at the portable transfer container, wherein the user is depositing the resource distribution documents.

11. The computer program product of claim 8, further comprising an executable portion configured for withdrawing resource distribution documents from the portable transfer container for a user authorized to withdraw resource distribution documents.

12. The computer program product of claim 8, wherein identifying an amount, denomination, and directive destination for the received resource distribution documents further comprises taking an image of the resource distribution documents as the resource distribution documents are being received and withdrawn at the portable transfer container.

13. The computer program product of claim 8, wherein exchanging the portable transfer container at the requestor with the identified portable transfer container further comprises updating the ledger with the exchange and reconciling accounts associated with the exchange and the portable transfer container.

14. A computer-implemented method for providing a network of portable transfer containers, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

generating multiple portable transfer containers, wherein a portable transfer container is configured to store resource distribution documents, dispense resource distribution documents, and receive resource distribution documents;

communicable linking the multiple portable transfer containers across a network to a centralized ledger database;

identifying an amount, denomination, and directive destination for resource distribution documents received at a portable transfer container of the multiple portable transfer containers across the network;

compiling, in real-time, the amount, denomination, and directive destination for resource distribution documents received at the multiple portable transfer containers via the communicable linage;

receiving a request for a specific denomination of resource distribution documents from a user with the network;

identifying a portable transfer container with the denomination of the request and allow for transmission of the identified portable transfer container to a requestor of the request; and exchanging the portable transfer container at the requestor with the identified portable transfer container.

15. The computer-implemented method of claim 14, wherein receiving resource distribution documents from a user at a portable transfer container further comprises:

authenticating an identity of the user; and comparing an authorized region of the user and a location of the portable transfer container and determining that the location of the portable item transfer container is within the authorized region of the user.

16. The computer-implemented method of claim 14, further comprising receiving resource distribution documents from a user at the portable transfer container, wherein the user is depositing the resource distribution documents.

17. The computer-implemented method of claim 14, further comprising withdrawing resource distribution documents from the portable transfer container for a user authorized to withdraw resource distribution documents.

18. The computer-implemented method of claim 14, wherein identifying an amount, denomination, and directive destination for the received resource distribution documents further comprises taking an image of the resource distribution documents as the resource distribution documents are being received and withdrawn at the portable transfer container.

19. The computer-implemented method of claim 14, wherein exchanging the portable transfer container at the requestor with the identified portable transfer container further comprises updating the ledger with the exchange and reconciling accounts associated with the exchange and the portable transfer container.

* * * * *